(12) United States Patent
Alward et al.

(10) Patent No.: US 8,843,754 B2
(45) Date of Patent: Sep. 23, 2014

(54) CONTINUOUS USER IDENTIFICATION AND SITUATION ANALYSIS WITH IDENTIFICATION OF ANONYMOUS USERS THROUGH BEHAVIORMETRICS

(75) Inventors: Herbert Lewis Alward, Coeur d'Alene, ID (US); Timothy Erickson Meehan, Richland, WA (US); James Joseph Straub, III, Coeur d'Alene, ID (US); Robert Michael Hust, Hayden, ID (US); Erik Watson Hutchinson, Spokane, WA (US); Michael Patrick Schmidt, Pasco, WA (US)

(73) Assignee: Identity Metrics, Inc., Centreville, VA (US)

( * ) Notice: Subject to any disclaimer, the term of this patent is extended or adjusted under 35 U.S.C. 154(b) by 1307 days.

(21) Appl. No.: 11/901,450

(22) Filed: Sep. 17, 2007

(65) Prior Publication Data
US 2008/0098456 A1    Apr. 24, 2008

Related U.S. Application Data

(60) Provisional application No. 60/844,918, filed on Sep. 15, 2006, provisional application No. 60/845,001, filed on Sep. 15, 2006.

(51) Int. Cl.
*G06F 21/00* (2013.01)
*G06F 21/31* (2013.01)

(52) U.S. Cl.
CPC .................. *G06F 21/316* (2013.01)
USPC .......................................... 713/182

(58) Field of Classification Search
CPC ..................................... G06F 21/316
USPC .......................................... 713/182
See application file for complete search history.

(56) References Cited

U.S. PATENT DOCUMENTS 4,621,334 A    11/1986  Garcia
4,805,222 A *  2/1989  Young et al. .................. 382/115
(Continued)

FOREIGN PATENT DOCUMENTS

EP        1255392        11/2002

OTHER PUBLICATIONS

Monrose, Fabian, and Aviel D. Rubin. "Keystroke dynamics as a biometric for authentication." Future Generation computer systems 16.4 (2000): 351-359.*

(Continued)

*Primary Examiner* — Harris Wang
(74) *Attorney, Agent, or Firm* — Tsircou Law, P.C.

(57) ABSTRACT

This invention discloses a system for determining whether a purported or alleged authorized user is in fact the authorized user, by comparing new data on a real-time basis against probability distribution representations including an authorized user probability distribution representation and a global or wide population probability distribution representation, to provide a probability as to whether the purported authorized user is the authorized user. This invention may utilize keyboard dynamics or data, or X-Y device data, or other data from similar measurable characteristics, to determine the probability that the new data from the purported authorized user indicates or identifies that user as the authorized user. This invention identifies the user continuously as the user interacts with the system and to identify a change in situation in the environment of the user. This invention provides a means to identify an anonymous user by matching the continuous recorded behaviormetrics or a characteristic of the anonymous user with the behaviormetrics of known users.

20 Claims, 12 Drawing Sheets

(56) References Cited

U.S. PATENT DOCUMENTS

| | | | |
|---|---|---|---|
| 5,343,529 A | | 8/1994 | Goldfine et al. |
| 5,386,103 A | | 1/1995 | DeBan et al. |
| 5,870,723 A | | 2/1999 | Pare, Jr. et al. |
| 5,974,162 A | | 10/1999 | Metz et al. |
| 6,006,188 A | | 12/1999 | Bogdashevsky et al. |
| 6,012,052 A | | 1/2000 | Altschuler et al. |
| 6,102,052 A | * | 8/2000 | Versteijnen ............... 134/22.1 |
| 6,151,593 A | * | 11/2000 | Cho et al. .................. 706/16 |
| 6,173,260 B1 | * | 1/2001 | Slaney ..................... 704/250 |
| 6,298,348 B1 | | 10/2001 | Eldering |
| 6,311,272 B1 | * | 10/2001 | Gressel ..................... 713/186 |
| 6,429,927 B1 | | 8/2002 | Borza |
| 6,442,692 B1 | * | 8/2002 | Zilberman .................. 713/184 |
| 6,487,662 B1 | * | 11/2002 | Kharon et al. .............. 713/186 |
| 6,553,494 B1 | | 4/2003 | Glass |
| 6,810,480 B1 | | 10/2004 | Parker et al. |
| 6,938,159 B1 | | 8/2005 | O'Connor et al. |
| 6,957,185 B1 | | 10/2005 | Labaton |
| 6,983,061 B2 | | 1/2006 | Ikegami et al. |
| 7,130,452 B2 | | 10/2006 | Bolle et al. |
| 7,133,792 B2 | | 11/2006 | Murakami et al. |
| 7,206,938 B2 | * | 4/2007 | Bender et al. .............. 713/186 |
| 7,245,218 B2 | | 7/2007 | Ikehara et al. |
| 7,249,263 B2 | | 7/2007 | Chaudhari et al. |
| 7,327,859 B1 | | 2/2008 | Chau et al. |
| 7,370,208 B2 | | 5/2008 | Levin et al. |
| 7,494,061 B2 | | 2/2009 | Reinhold |
| 7,565,548 B2 | | 7/2009 | Fiske et al. |
| 7,818,290 B2 | | 10/2010 | Davis et al. |
| 2001/0004733 A1 | * | 6/2001 | Eldering ..................... 705/14 |
| 2002/0095586 A1 | * | 7/2002 | Doyle et al. ................ 713/186 |
| 2002/0112171 A1 | | 8/2002 | Ginter et al. |
| 2002/0129368 A1 | | 9/2002 | Schlack et al. |
| 2002/0174347 A1 | * | 11/2002 | Ting ......................... 713/186 |
| 2003/0065595 A1 | | 4/2003 | Anglum |
| 2003/0074201 A1 | | 4/2003 | Grashey et al. |
| 2004/0015714 A1 | | 1/2004 | Abraham et al. |
| 2004/0034558 A1 | | 2/2004 | Eskandari |
| 2005/0008148 A1 | | 1/2005 | Jacobson |
| 2006/0104484 A1 | | 5/2006 | Bolle et al. |
| 2006/0104486 A1 | | 5/2006 | Le Saint et al. |
| 2006/0195328 A1 | * | 8/2006 | Abraham et al. ............. 705/1 |
| 2006/0206724 A1 | | 9/2006 | Schaufele et al. |
| 2006/0224898 A1 | | 10/2006 | Ahmed |
| 2006/0288234 A1 | | 12/2006 | Azar et al. |
| 2007/0005988 A1 | | 1/2007 | Zhang et al. |
| 2007/0011039 A1 | | 1/2007 | Oddo |
| 2007/0036395 A1 | | 2/2007 | Okun |
| 2007/0245157 A1 | | 10/2007 | Giobbi et al. |
| 2008/0092245 A1 | * | 4/2008 | Alward et al. ............... 726/28 |
| 2008/0098456 A1 | * | 4/2008 | Alward et al. ............... 726/1 |
| 2008/0104415 A1 | | 5/2008 | Palti-Wasserman et al. |

OTHER PUBLICATIONS

Defining dynamic Bayesian networks for probabilistic situation assessment, Fischer, Y. ; Beyerer, J. Information Fusion (Fusion), 2012 15th International Conference on Publication Year: 2012 , pp. 888-895.*

Bandi, K.R. and Srihari, S.N. "Writer Demographic Classification Using Bagging and Boosting", Proc. International Graphonomics Society Conference (IGS), Jun. 2005, Salerno, Italy, pp. 133-137.

Body for Electronic Signatures Uniform Electronic Transactions Act (UETA).

Cottrell, G.W. and Metcalfe, J. "EMPATH: Face, Emotion, and Gender Recognition using Holons", Proc. 1990 Conf. Advances Neural Information Processing Systems, 1990, Denver, Colorado, pp. 564-571.

Golomb, B.A.; Lawrence, D.T.; and Sejnowski, T.J. "SexNet: A Neural Network Identifies Sex from Human Faces", Proc. 1990 Conf. Advances Neural Information Processing Systems, 1990, Denver, Colorado, pp. 572-577.

Gunetti, D. et al.; "Keystroke Analysis of Free Text" ACM Transactions on Nformation and System Security, vol. 8, Aug. 2005, pp. 312-347.

Han, J.Y.; "Low-Cost Multi-Touch Sensing through Frustrated Total Internal Reflection" UIST '05, Oct. 2005, Seattle, ACM, pp. 115-118.

Henniger, O.; Schneider, B.; Struif, B.; and Waldmann, U. "Improving the Binding of Electronic Signatures to the Signer by Biometric Authentication", Advances in Biometrics: International Conference, Hong Kong, China, 2006, pp. 523-530.

Lu, X.; Chen, H.; and Jain, A. K. "Multimodal Facial Gender and Ethnicity Identification", Advances in Biometricks: International Conference, Hong Kong, China, 2006, pp. 554-561.

Monrose, F. et al. "Password hardening based on keystroke dynamics," Proceedings of sixth ACM Confernece on computer and Communications Security, CCCS 1999.

Obaidat, M.S. and Sadoun, B. "Keystrok Dynamics based Identification," Biometrics: Personal Identification in Networked Society; Anil Jain et al, editors. Kluwer, MA 1998.

Obaidat, M.S. and Sadoun, B. "Keystrok Dynamics based Identification," Biometrics: Personal Identification in Networked Society; Anil Jain et al, editors. Kluwer, MA. 1998.

Pusara, M. and Brodley, C.E., "User ReAuthentication via Mouse Movements" In Proceedings of the 2004 ACM Workshop on Visualization and Data Mining for Computer Security, ACM, New York, NY, pp. 1-8.

Sato, Y. and Kogure, K. "On-line Signature Verification. Based on Shape, Motion, and Writing Pressure", Proc. 6th Int. Conf. on Pattern Recognition, pp. 823-826, 1982.

The Electronic Signatures in Global and National Commerce Act (ESIGN, Pub.L. 106-229, 14 Stat. 464, enacted Jun. 30, 2000, 15 U.S.C. ch.96).

Yun, M.H. et al. "Classification of Bluffing Behavior and Affective Attitude from Prefrontal Surface Encephalogram During On-Line Game" Advances in Biometrics: International Conference, Hong Kong, China, 2006, pp. 562-570.

Zhang, S. et al.; "Continuous Verification Using Mutlimodal Biometrics" Advances in Biometrics: International Conference, Hong Kong, China, 2006, pp. 562-570.

"SecurID Token", http://www.is.mcgill.ca/minerva/Security/securid_token.htm, (Jun. 3, 2003).

"Baye's Theorem—Wikipedia", http://web.archive.orglweb/20031204023001/http://en.wikipedia.orglwikilBayes'_theorem.

* cited by examiner

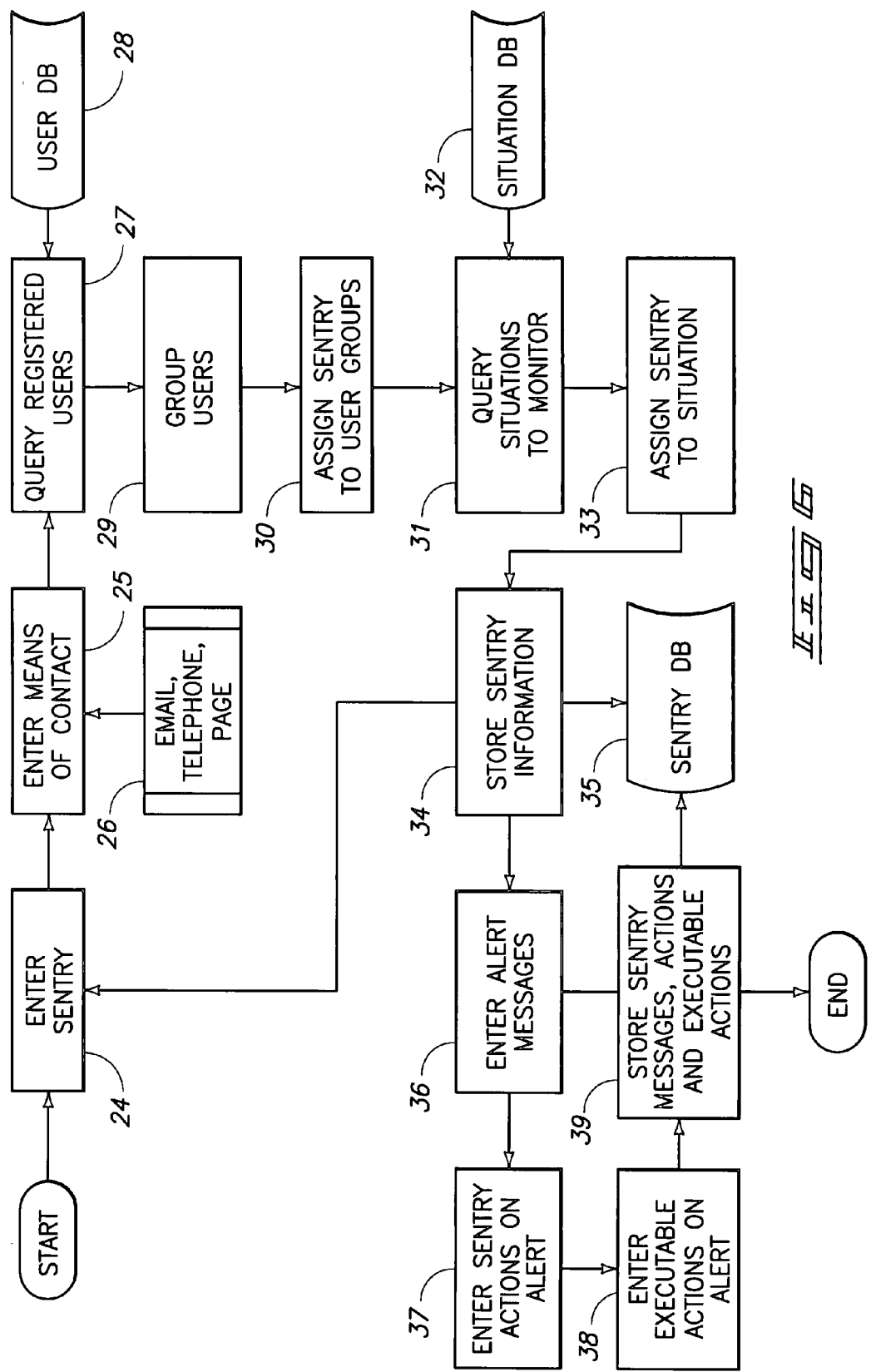

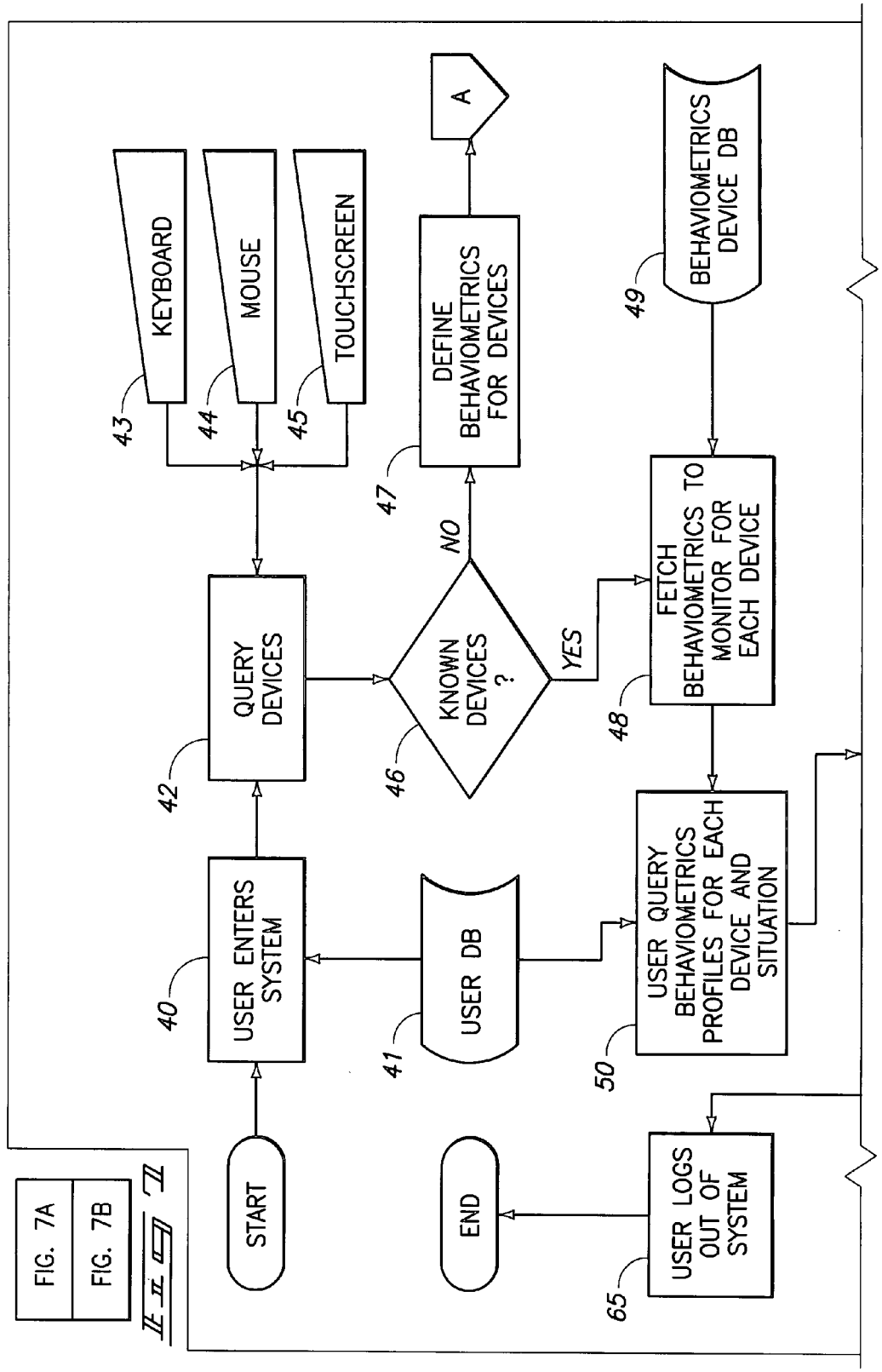

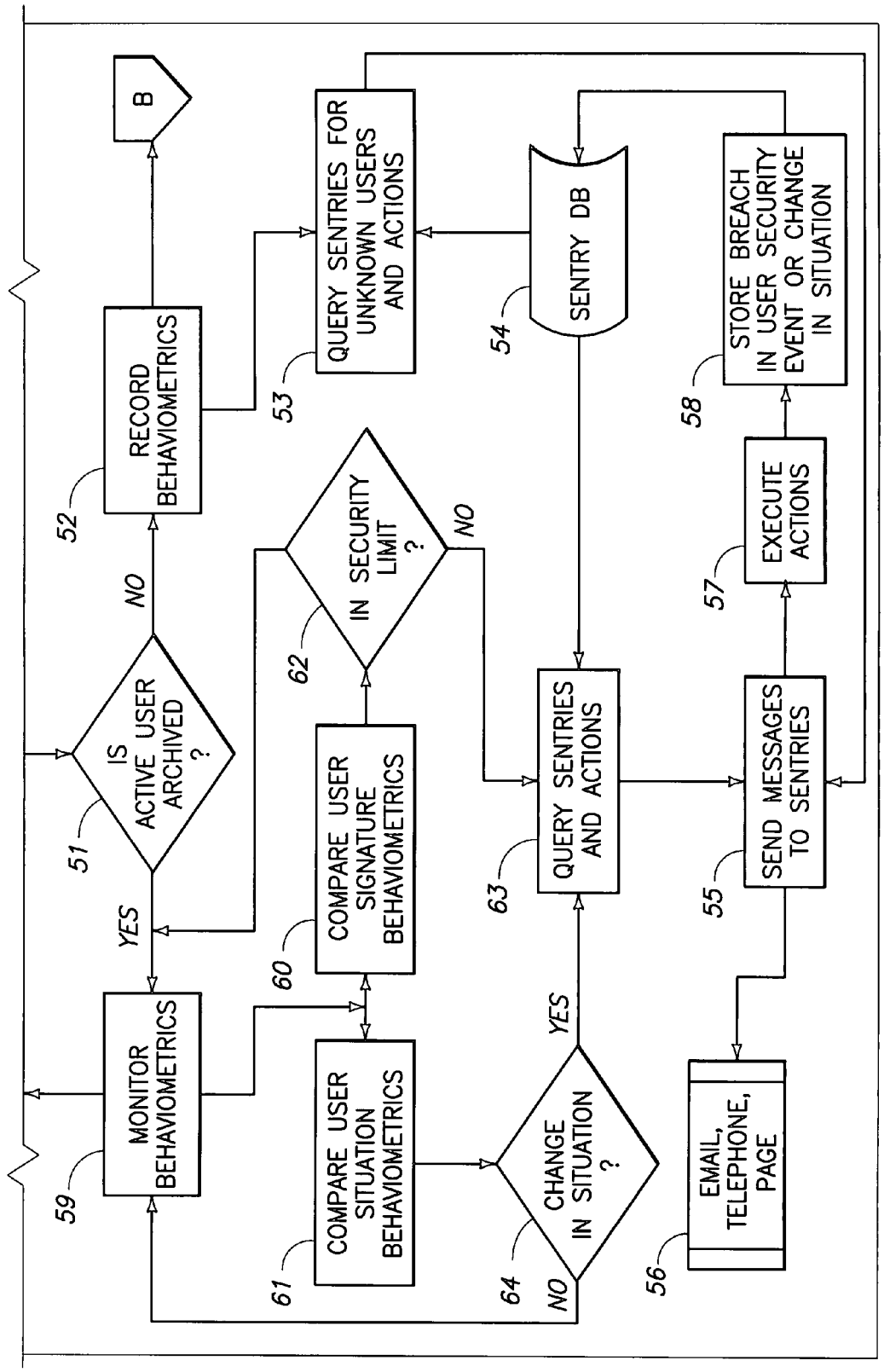

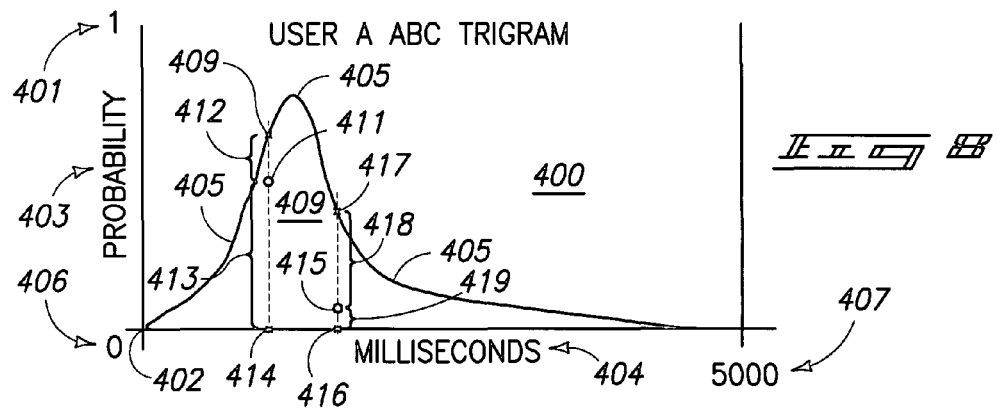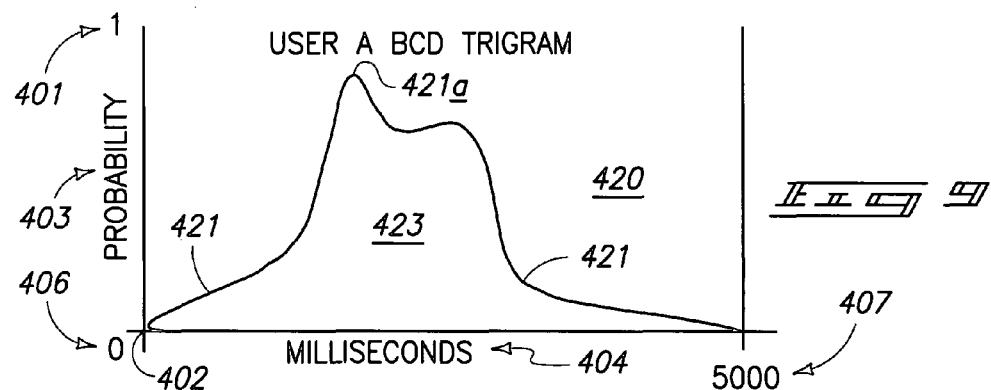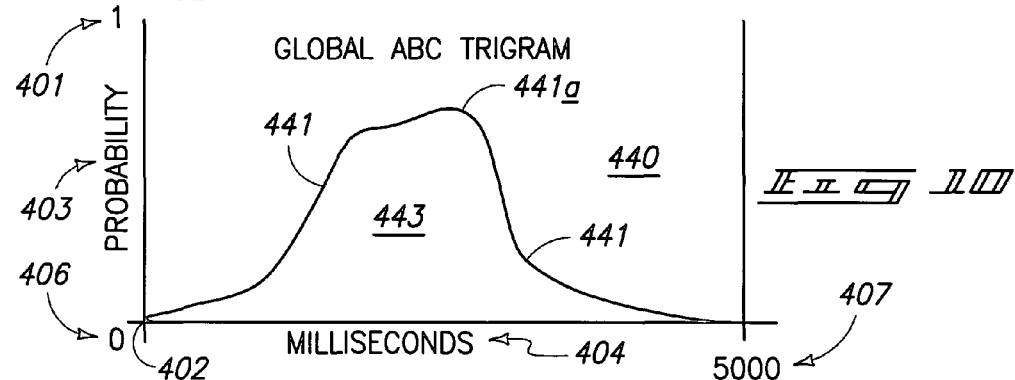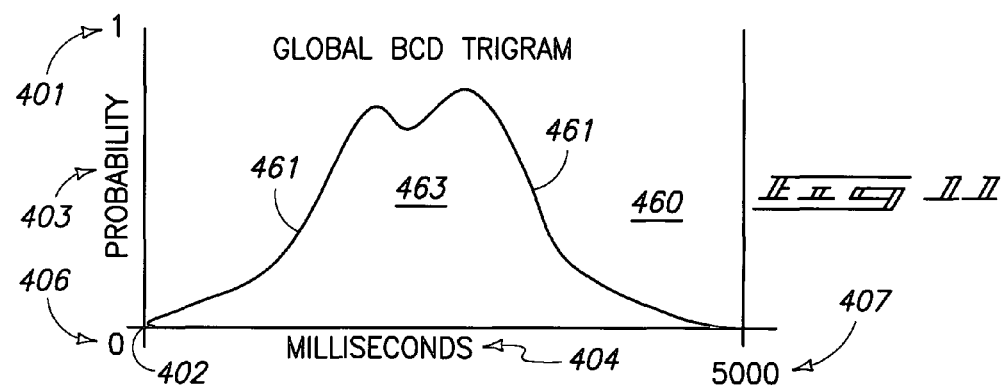

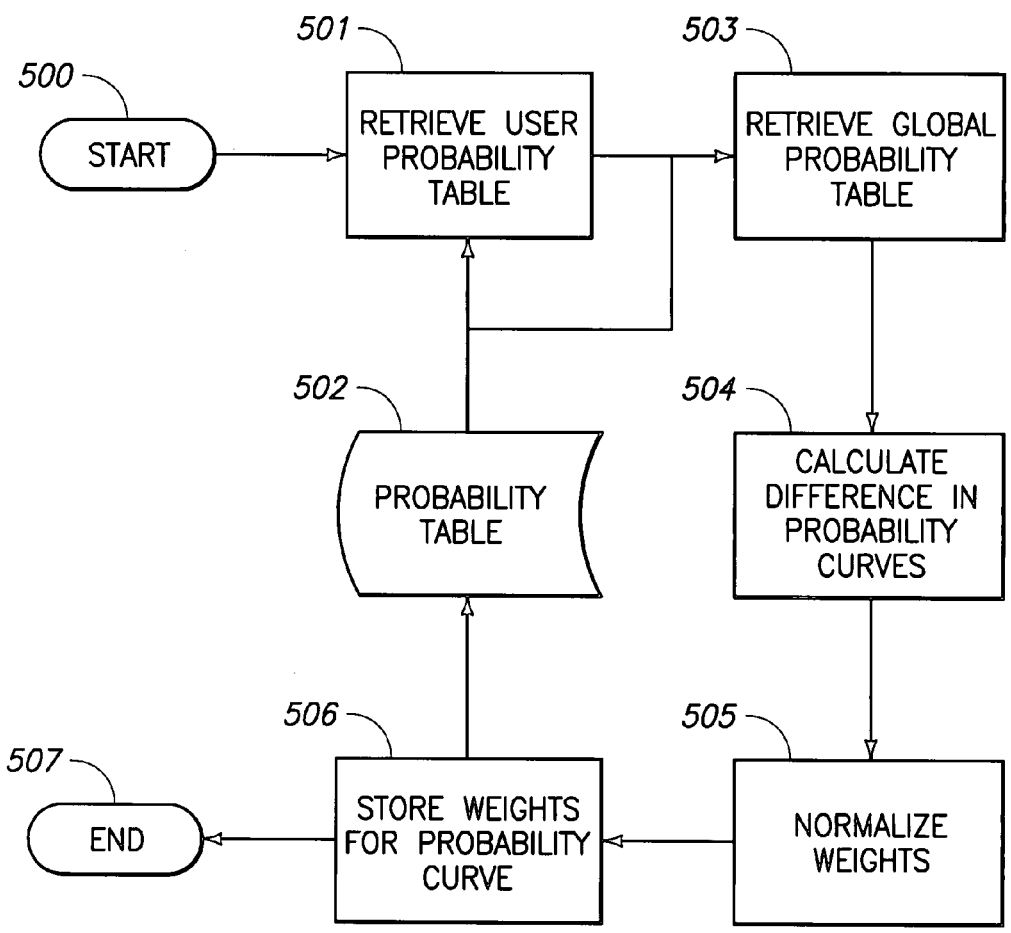

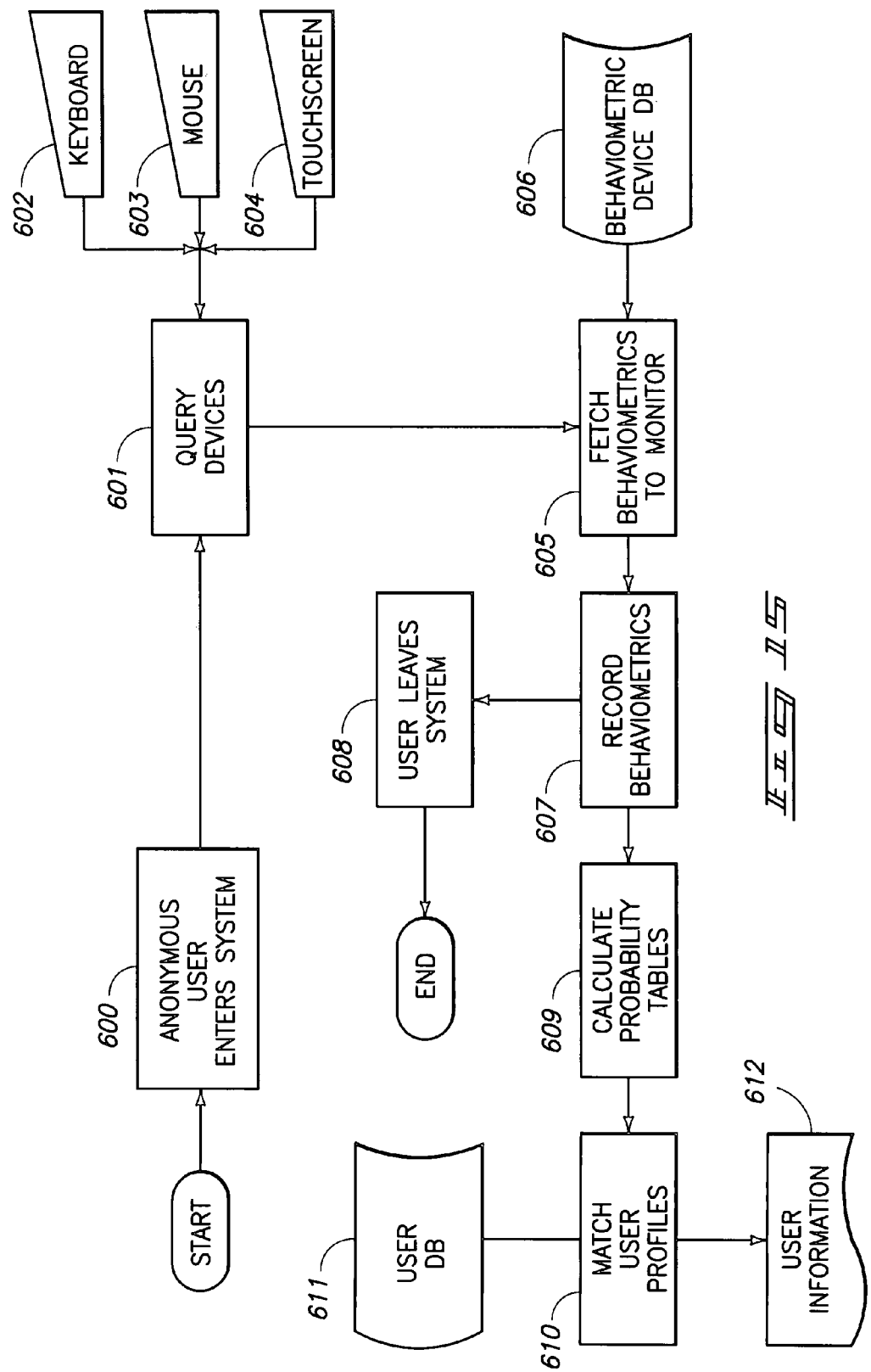

CONTINUOUS USER IDENTIFICATION AND SITUATION ANALYSIS WITH IDENTIFICATION OF ANONYMOUS USERS THROUGH BEHAVIORMETRICS

CROSS REFERENCE TO RELATED APPLICATION

This application claims priority from the following applications: (1) U.S. provisional patent application No. 60/844,918 filed Sep. 15, 2006, confirmation No. 2363, entitled "Adaptive method and system for continuous user identification and situation analysis" by inventors Herbert Lewis Alward, Coeur d'Alene, I D, Timothy Erickson Meehan, Richland, W A, James Joseph Straub III, Coeur d'Alene, I D, and Robert Michael Hust, Hayden, I D; and (2) U.S. provisional patent application No. 60/845,001, filed Sep. 15, 2006, confirmation No. 2205, entitled "Adaptive system and method for the classification of anonymous users via behaviormetrics and a fast-classification neural net" by inventors Herbert Lewis Alward, Coeur d'Alene, I D, Timothy Erickson Meehan, Richland, W A, Erik Watson Hutchinson, Spokane, W A and Michael Patrick Schmidt, Pasco, W A. The above-referenced US provisional patent applications are hereby incorporated herein by this reference as though fully set forth herein, including specification and drawings.

TECHNICAL FIELD

This invention relates to a user identification and authentication system for determining the identity or classification of an anonymous user and for determining a probability that a purported authorized user of a system is in fact the authorized user of the system as the user continuously interacts with a computing device. This invention also monitors the changes in a situation or environment at the computing device through the behaviormetrics of the user at the computing device. More particularly, this invention utilizes data from keyboard or similar devices and/or from X-Y devices such as a computer mouse or a touch pad, to provide ongoing or real time data to be compared with authorized user data and/or wide population data to determine a probability that the purported authorized user is in fact the authorized user.

BACKGROUND OF THE INVENTION

Many devices and systems use a keyboard or similar terminal as a user interface to access the device or system. Keyboard terminals are generally hardware devices or user interfaces that emulate typewriters, but they are also keypads on cellular telephones, portable devices such as PDA's and touch screen devices, tablet computers, or other devices that use a touch screen for key entry. These types of devices with the user interfaces may for example be a computer or electronic machine that generally requires any type of input such as alphanumeric input, but keyboards are not restricted to having alphanumeric keys.

Typically when accessing these electronic devices some sort of means of authentication is desired or preferred, and a common such authentication is for an authorized user to be assigned a password or PIN (Personal Identification Number) to allow them to access and use of the device. Other types of systems may also desire to require or provide authentication, such as some computer software applications, which may for example require a password to allow an authorized user to enter the application on the computer it resides, or to enter certain more secure portions of the software or data.

While passwords provide some protection, passwords and other unique names such as user names, may also be a vulnerable point of security access due to any one of a number of different factors, such as poor choice of user-defined passwords, stolen passwords, lost passwords or the user exposes the password to an unauthorized party. In response to the vulnerability of passwords, the industry has incorporated secondary devices such as electronic signatures, smart cards, and biometric devices: fingerprint and retinal scanners, etc, thus requiring the user to log into the system via redundant, multiple and/or varied means. An added safeguard in software applications is to force a user to re-enter the access devices at certain intervals or at certain points-of-entry. These devices and mechanisms however can not prevent an unauthorized user from stealing the secondary devices or from preventing a criminal party from forcing the user to enter the password and/or secondary devices at any given time. None of these methods will protect the system, if the authorized user leaves the keyboard without properly logging out of the system, thus leaving the system open to any bystander or passing unauthorized party.

Current devices are one time security screens, which do not prevent continuous secure access. For example, if a person leaves a system they accessed, an illicit user can use the open system to perform whatever actions they desire. Also these same security measures do not have means to identify the individual that has accessed the open system or stolen the username/password or smart card. Once these security measures are compromised, the thief has unrestricted access. Embodiments of this invention eliminate these problems by providing a continuous user authentication method and a means to identify the user if the user is anonymous or suspected to be an impostor.

At the keyboard, statistical dynamics of the keyboard typing/entry are unique to the user, with some dynamics more unique than others. Therefore, the dynamics of the authorized user's use of the keyboard and components thereof, provide a way of identifying a probability that the purported authorized user is in fact the authorized user. This dynamic use unique to or indicative of a particular person may also be referred to as a statistical signature of the authorized user at the human device interface. The ongoing dynamic use of the user interface such as the keyboard or X-Y device provides real time, continuous data which may be utilized to authenticate the user. In the scenario an unauthorized party would gain access to a system with keyboard entry under an authorized user's identity, the keyboard dynamics may then be utilized to expose the immediate user, or the purported or alleged authorized user, as probably not being the authorized user whose identity was used to gain access. In the scenario of the user leaving the system open to access without logging out, then a new individual who begins to use the keyboard would then be detected as probably not being the registered user. In either case, the attempted unauthorized access may be identified in a real time, continuous fashion, by embodiments of this invention. Prior art focused on the timing of the keystrokes as the identifying behavior of the user.

Human behavior also responds to changes in mood or situation. In a stressful situation, they may type faster or apply more pressure to the interface, while in a depressed mood they may type more slowly or erratically. In these cases, a change in behavior signals a change in the person or surroundings leaving a signature for the type of change as handwriting would also expose a person's mood.

Embodiments of this invention may also provide a way to account for and sense varying data for a specific authorized user, such as for instance a different authorized user profile when the authorized user is engaging in the measurable dynamics or characteristics at different times of the day, length of time the authorized user has been accessing the system, under different stress or fatigue levels, or any one of a number of different ways there can be a measurable and predictable variance in the data. The timing of the keystrokes, or any one of a number of other different measurable data of the use of the keyboard provide a probable way to identify a particular user.

This invention provides for the authentication of a user via the keystroke typing behavior of the authorized user, or by the X-Y device movement or dynamics of the authorized user. Unlike other biometric devices, it is non-intrusive and adaptable to changes in the user's behavior. The keyboard dynamics and/or X-Y device dynamics system provided by this invention is relatively scalable through the use of probability distribution representations, which in some examples or embodiments, may provide scales relative to O(1) number of users in calculating the likelihood the user is the authorized user. Other implementations scale to n or $n^2$ number of users. Embodiments of this invention may also provide a means to notify security sentries and execute programmed actions upon a breach in security based on the keyboard dynamics.

An object of some embodiments of this invention is to provide a user authentication or identification system using data related to mouse dynamics to determine if it is probable that the data is indicative that the purported authorized user is actually the authorized user, based on the chosen data characteristic (which in some aspects of the invention may be like a signature) for the authorized user.

Probability distribution representations may be used in embodiments of this invention to identify if the purported or alleged authorized user is in fact the authorized user. Calculation and/or algorithms may be utilized to calculate the likelihood the alleged authorized user is the legitimate authorized user who has been authorized to access the system, account or device. The probability distribution representations provide a fast, adaptable and scalable mechanism for discerning legitimate users from illegitimate users. Embodiments of this invention may also provide a system to provide security alerts to, or notify, sentries when the system determines that it may be probable that the new or purported authorized user may not in fact be the authorized user. In some aspects of this invention, the security notification mechanism may provide a more proactive notification and security system to better secure the system to which it is being applied.

It is also an object of some embodiments of this invention to provide a more scalable system for verifying the identity of an identified user or user group or class of users.

It is an object of some embodiments of this invention to provide a system for determining which of a plurality of identifying data points provide identification of an anonymous user, user group or class of users or change in situation in the environment of the user.

While the invention was motivated in addressing some objectives, it is in no way so limited. The invention is only limited by the accompanying claims as literally worded, without interpretative or other limiting reference to the specification, and in accordance with the doctrine of equivalents.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 6 is an exemplary flowchart illustrating an embodiment of this invention wherein the sequence of steps employed to configure a system to notify the proper sentries of a user as to whether the purported authorized user is the authorized user based on keyboard dynamics;

FIG. 7 is an exemplary flowchart illustrating an embodiment of this invention wherein the sequence of steps employed to configure a system to compare keyboard dynamics of a purported authorized user to the authorized user probability distribution representation, notifying the proper sentries of a probability as to whether the purported authorized user is the authorized user or a change in situation has occurred;

FIG. 8 is a graphic representation of one embodiment of a probability distribution representation for keystroke timings of a user typing keystrokes ABC;

FIG. 9 is a graphic representation of one embodiment of a probability distribution representation for keystroke timings of a user typing keystrokes for the key combination of BCD;

FIG. 10 is a graphic representation of one embodiment of a probability distribution representation for keystroke timings of a wide population demographic user group typing keystrokes for the key combination of ABC;

FIG. 11 is a graphic representation of one embodiment of a probability distribution representation for keystroke timings of a wide population demographic user group typing keystrokes for the key combination of BCD;

FIG. 14 is an exemplary flowchart of an embodiment of this invention illustrating one possible sequence for constructing a biased scoring system using a characteristic data of an authorized user; and FIG. 15 is an exemplary flowchart illustrating an embodiment of this invention wherein the sequence of steps employed to identify an anonymous user using the recorded behaviormetrics of known users.

DETAILED DESCRIPTION OF THE PREFERRED EMBODIMENTS

Figure 1:
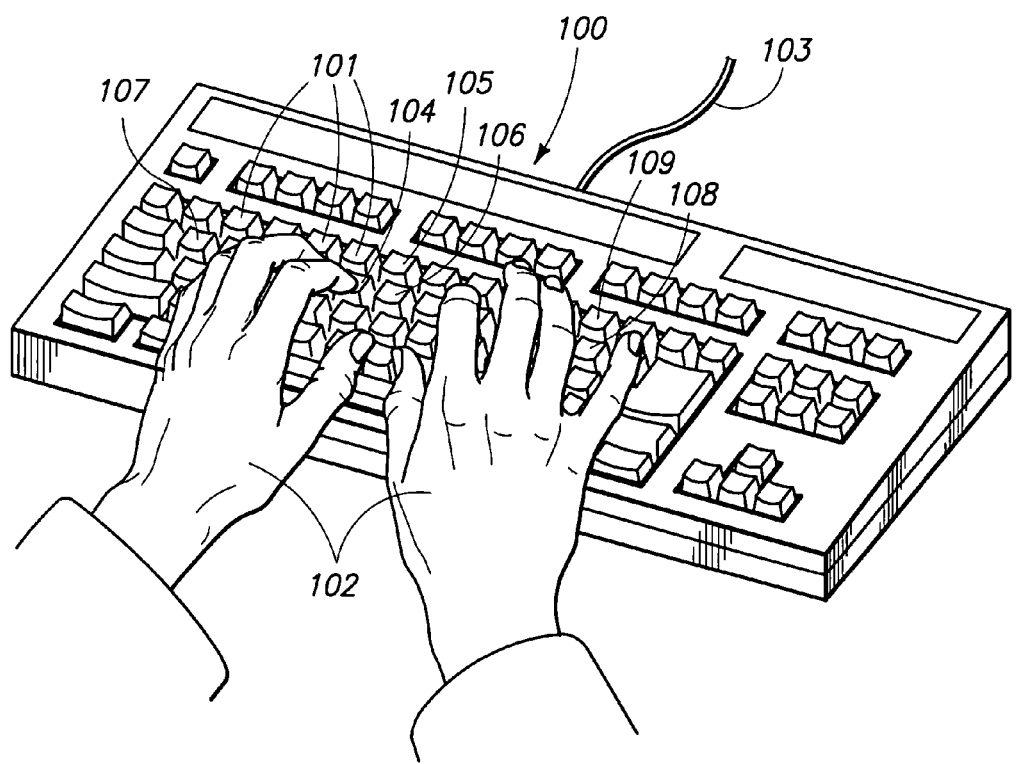
FIG. 1 is a perspective view of a user keying on a traditional keyboard.

The term "data" as used herein may be any individual or group of data, data points or items, from any one of a number of sources and may be any one of a number of different types of data. Data for example may be a sensed data or grouping of individual data points or data, or a measurement of most anything that can be measured, preferably related to behavior or distinguishing characteristics. Some examples of data may include information, parameters, keystroke dynamics, X-Y device dynamics, events, characteristics, facial movement, eye movement, facial profile, data points, groups of data points or characteristics, inputs, signals, etc. A data signal as used herein refers to parsing data into discrete signals as they are defined for a specific data type. For example, a document or sentence is data which can be parsed into data signals as words or characters. For probability distributions, the distributions are data that can be parsed into data signals as probability values as discrete signals.

When the phrase accessing is used in connection with accessing data or accessing characteristics or accessing other items, it is not limited to accessing data or information from outside the processor, but instead would include all such items accessed within the data processing apparatus or system, or external.

It will also be appreciated by those of ordinary skill in the art that data may also be a grouping or combination of any of the foregoing. As one example, data points from keystroke dynamics from a user typing keys and keyboard or key-based interface, the timing of keying of keystrokes or keystroke combinations, may be measured for example for a series of keystrokes such as typing the keys ABC or BCD.

In some aspects of this invention, data is obtained by taking measurements from an X-Y device, for example measuring the speed at which a user moves a computer mouse, or the location area where a user tends to leave the computer mouse in the rest position, or the trajectory which the user tends to follow in moving a computer mouse (or the user's finger on a touchpad input device to electronic system, or on a tablet computer). Another example may be wherein data such as the pressure which a user asserts on a tablet computer user interface (e.g. a screen), which in some examples includes sensing pressure on a scale of zero to fifty-six.

The term "probability distribution representation" may be a behavioral record which may, but need not be, related to frequency of an identified behavior, component of behavior, measurement of behavior or other data point. It will be recognized by those of ordinary skill in the art that these tables may come in numerous shapes, forms, configurations, scales and may include singular measurements, groupings of measurements, groupings of data or any other individual data or data points or items, which may provide identifying information for comparison, or for distinguishing a particular identified or authorized user. Examples of probability distribution representations may be probability tables, histograms, bar graphs, frequency record, event count, profile, record, lookup tables, probability lookup tables, behavioral profiles, bar graphs, distribution functions, or others, all within the contemplation of this invention. There may be different ways to visually represent a probability distribution representation, such as a bar chart, curve, smoothed curve, series of data points represented graphically, a histogram or others, with no one in particular being required to practice this invention. Known techniques may be utilized to create or smooth or alter the curve and/or data representation.

When the term authentication is used herein it may be broader than its traditional definition in that it may refer at least in part to identify, identification, authorizing, authenticating, labeling, associating, or fingerprinting the data to an identified or authorized user for any one of a number of different purposes. Examples of purposes for which authentication is desired may be authenticating that the person possessing a password and entering into an online account is the person or authorized user whose profile is recorded and the person that is authorized to enter that count. For instance, if keystroke dynamics or keystroke data provides the measurable or ascertainable data, then a comparison of the users keystroke dynamics to the probability distribution representations for that user in the global probability distribution representations for that keystroke dynamic would be compared in order to verify a probability that the purported or alleged authorized user is the identified user or authorized user.

When the term or phrase "authorized user" is used herein, it means not only a single user, but may also include a class, group or demographic of users all within the meaning of the phrase "identified user". For example, it may include persons within an accounting group at a corporation who have access to a computer or electronic system or network; or it may include a group of people classified together because they are all left-handed, wherein this invention is not limited to any one in particular.

The term global in relation to a probability distribution reference or references may also be referred to as a wide population reference, for which there is no particular number or quantity of data points blended, but which will depend upon the circumstances. In most if not all cases the wide population data will include more than a sample of one since the one data point would be from the current purported authorized user.

Embodiments of this invention are methods and apparatus configured to receive, which may in some examples mean a system is configured to receive, collect, capture, sense or parse data, and then to process or utilize said data as further described herein.

Embodiments of this invention may provide a desired advantage of being more scalable than other systems, in that substantial or even massive amounts of data, characteristics, information or other measurable input data may be incorporated into one or more probability distribution representations or histograms to provide a single or a small number of probability distribution representations against which to compare the new information with. This means that massive information such as gathered over the World Wide Web or Internet may be distilled into one or relatively few probability distribution representations against which the data can be quickly compared to determine if it is more probable than not that the purported authorized user, is in fact the authorized user. The system designer adapting embodiments of this invention to a given application will have many options in determining what type of probability distribution representation to construct, the data to best distinguish the distinguishing characteristic, and further in defining the universe of data that may be combined to comprise the probability distribution representation, to optimize the ability to distinguish a user, or to authenticate the authorized user.

Embodiments of this invention may but need not necessarily include an adaptive, scalable method to acquire a behavioral signature for a user of a system who utilizes a keyboard. These embodiments of this invention may for instance accomplish this by tracking a pattern of keyboard dynamics made by the user. This keyboard dynamic pattern becomes a signature for the user and can be used to determine if the user at the keyboard is the same user registered as the current user via other electronic means such as a password or smart card, etc. The system defines the means to record the pattern, track the users at the keyboard terminal and notify proper authorities when the user at the keyboard is determined to be different than the user who is registered as the active user at the keyboard.

As fingerprints identify individual people, so does certain keyboard dynamic or other data identify an individual. Keyboard devices may render an identifiable signature related to the typing of the keys. This data or characteristics of use may be used in similar fashion, such as utilizing the pattern with which the user interfaces with or used the keyboard or parts thereof. This may in one example consist of measuring the hold time of keys and/or the timing of the keystrokes. The pattern of certain keystrokes may be sufficiently individualistic or unique to each individual due to any one of a number of different factors, such as for example the relationship between the timing of keystrokes between keys and to the length of their arms, fingers, size of arm and finger strength and familiarity with the keyboard. For another example, users may have different timing between keys "a" and "x" on a Standard English keyboard. The set of the differences between the keys may yield a set of keystroke relationships for determining the probability that a particular user is at a keyboard. The pattern of timing between the keys may then become a unique identifier or signature of sorts, of the user.

Embodiments of this invention may there include the establishment of measurements and places probability profiles on the keyboard dynamics of any chosen n-gram measurement. The measurements may pertain to and are not restricted to the hold time of a keystroke, the timing between keystrokes, or the total time to produce an n-gram measurement of keystrokes. The n-gram measurement can be a single key, two keys to n keys to acquire the measurement. For example, a trigraph would capture sets of three keys to determine the measurement.

To establish the probability profile of a user, the system captures the keyboard events and the frequency of the keyboard events produced by the user and stores the results. Table 1 illustrates an example event table for a trigraph. The system stores the three successive keys as a timing event in milliseconds and the corresponding frequency of occurrence. These measurements then yield a user profile.

TABLE 1

Trigraph user timing events of keystroke collections.

| User A Trigraph | | | Time (milliseconds) | | | | | |
|---|---|---|---|---|---|---|---|---|
| abc | 0 | 100 | 101 | 102 | ... | 450 | ... | 5000 |
| frequency | 0 | 4 | 0 | 2 | ... | 50 | ... | 0 |
| bcd | 0 | 100 | 101 | 102 | ... | 320 | ... | 5000 |
| frequency | 0 | 2 | 1 | 5 | ... | 35 | ... | 0 |

Once the system sufficiently captures the user profile, the system calculates the user probability distribution representation by applying a general kernel function, $K_h(x)$, which smoothes the measured data into a density estimator, given by:

$K_h(x)=1/hK(x/h)$, where h=bandwidth and

K=Uniform, Triangle, Quartic, Gaussian, Cosinus, or etc. kernel function.

The parameter, h, determines the smoothness of the estimation. When $h \to 0$, the kernel estimation is less smooth, and when $h \to \infty$, the kernel estimation is very smooth. The kernel function, K, can be any kernel estimation function where the $\int K(x) dx=1$. Table 2 illustrates the calculation of the likelihood for each keyboard event. Once trained for a user, when a keyboard event occurs, the system returns the likelihood value for that user.

TABLE 2

User Probability Distribution Representation.

| User A Trigraph | | | Time (milliseconds) | | | | | |
|---|---|---|---|---|---|---|---|---|
| abc | 0 | 100 | 101 | 102 | ... | 450 | ... | 5000 |
| Likelihood | 0.00 | 0.02 | 0.01 | 0.01 | ... | 0.26 | ... | 0.00 |
| bcd | 0.00 | 100 | 101 | 102 | ... | 320 | ... | 5000 |
| Likelihood | 0.00 | 0.01 | 0.01 | 0.02 | ... | 0.20 | ... | 0.00 |

To make the probability distribution representation more adaptive, more parameters and training can be tied to the probability distribution representation, such as time of day or type of application. The size of the user probability needs only to be as large as the typing key space for the user. In the case of username/password typing behavior where no further authentication is considered, then the user probability distribution representation needs to contain only the n-gram measurements for the user username/password set. In the case of continuous authentication of the user, then the user probability distribution representation needs to contain the entire set of possible ngram measurements.

To establish the probability profile for an impostor, the system establishes a global probability distribution representation which stores the probability profile of the other users to determine the probability the typist is an impostor and not the alleged user. As done for the user probability distribution representation, the system captures the users' keyboard dynamics and stores the timing and frequency of events. The results are smoothed using a general kernel function to establish a kernel density estimator. The estimator calculates the likelihood that the typist belongs in the global set of users versus the user profile. As in Tables 1 and 2, similar tables are constructed for the global probability distribution representation as illustrated in Tables 3 and 4.

TABLE 3

Global Timing Events of Keystroke Collections.

| Global Trigraph | | | Time (milliseconds) | | | | | |
|---|---|---|---|---|---|---|---|---|
| abc | 0 | 100 | 101 | 102 | ... | 400 | ... | 5000 |
| frequency | 0 | 1000 | 1200 | 900 | ... | 15000 | ... | 10 |
| bcd | 0 | 100 | 101 | 102 | ... | 380 | ... | 5000 |
| frequency | 0 | 700 | 400 | 1300 | ... | 12000 | ... | 17 |

TABLE 4

Global Probability Distribution Representation.

| Global Trigraph | Time (milliseconds) | | | | | | | |
|---|---|---|---|---|---|---|---|---|
| abc | 0 | 100 | 101 | 102 | ... | 400 | ... | 5000 |
| Likelihood | 0.00 | 0.05 | 0.06 | 0.05 | ... | 0.21 | ... | 0.00 |
| bcd | 0.00 | 100 | 101 | 102 | ... | 380 | ... | 5000 |
| Likelihood | 0.00 | 0.04 | 0.01 | 0.06 | ... | 0.18 | ... | 0.00 |

With both the user probability distribution representation and the global probability distribution representation, the system applies Bayes' Rule to determine a posterior probability the observed user is the alleged user. The posterior probability that the observed user is the alleged user, P(A|O), is given by:

$$P(A|O)=P(A)*L/((P(A)*L)+1-P(A)),$$

Where P(A) is the prior probability the user is the alleged User and L is the likelihood ratio. The likelihood ratio is given by P(O|A)/P(O|I), where P(O|A) is the probability the alleged user produced the observations and P(O|I) is the probability an impostor produced the observations. Based on the threshold set for the value of P(A|O), the system logs out the user or notifies a security sentry of a potential breach in security.

Determining the user signature via keyboard dynamics provides a means for establishing a system to monitor the identity of users throughout a network of electronic devices in real time continuously. The system to monitor user identities stores the user keyboard dynamics patterns and compares the stored user keyboard dynamics with the registered user purported to be using the keyboard, thereby providing a probability the purported user is the authorized user. The sentries of the identities establish the lower limit of the probability they find acceptable for each user. Once the probability of an identity falls below this limit, the system notifies the sentries and executes any predefined actions that it can machine execute through automated scripts or software applications.

FIG. 1 is a perspective view of a user keying on a traditional keyboard, showing user hands 102, keyboard 100, keys 101, cord 103 which may attach the keyboard to a data processing apparatus, or in the alternative, the keyboard may be wireless and communicate in a wireless manner with a data processing apparatus (not shown in FIG. 1).

Some aspects of this invention may capture or access the timing of certain keystrokes as one exemplary data element, or as a characteristic. Examples given below would be for a sequence of typing the keys such as ABC, and another example referencing the typing of keys BCD. However it will be appreciated that the typing of any key sequence may be utilized depending upon the data, and the comparisons where authentication may be sought. It will also be appreciated by those of ordinary skill in the art that any one of a different number of keys may be included within the sequence to arrive at data to be utilized in aspects of this invention. For example in the illustration shown in FIG. 1, a key stroke sequence may be established for keys 104, 105, 106, 107, 108 and 109, which may represent a common sequence or word commonly typed or keyed by users being authenticated. Any sub-combination, reverse combination or shorter or longer combinations may also be utilized.

It will also be appreciated by those of ordinary skill in the art that because embodiments of this invention have so many different applications, the term data as used herein may constitute a multitude of different measurements, characteristics, timings or any other element that can be measured or used to distinguish different individual users, different users within identified demographics and different demographic groups, to name a few.

Figure 2:
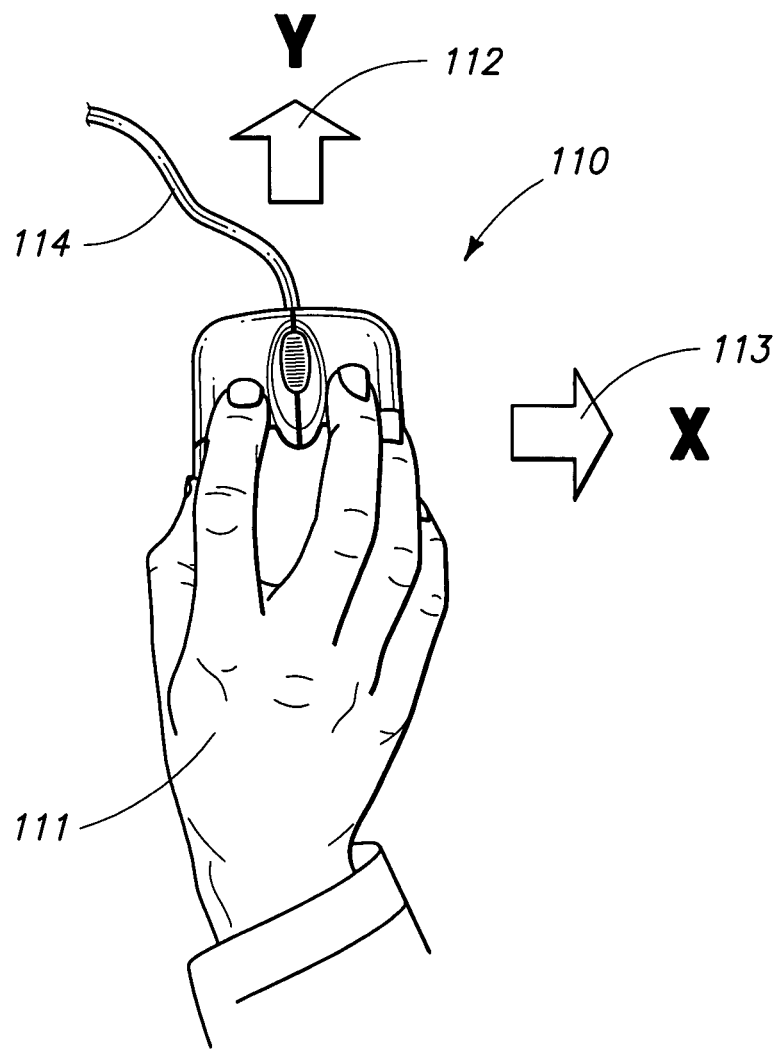
FIG. 2 is a top view of a user handling and moving an X-Y device, which in this example is a traditional computer mouse.

FIG. 2 is a top view of a user handling and moving an X-Y device, namely in this example a traditional computer mouse 110 providing the X-Y device dynamics, with connection cord 114, user hand 111, X direction movement indicated by arrow 113 and Y direction movement indicated by arrow 112.

Figure 3:
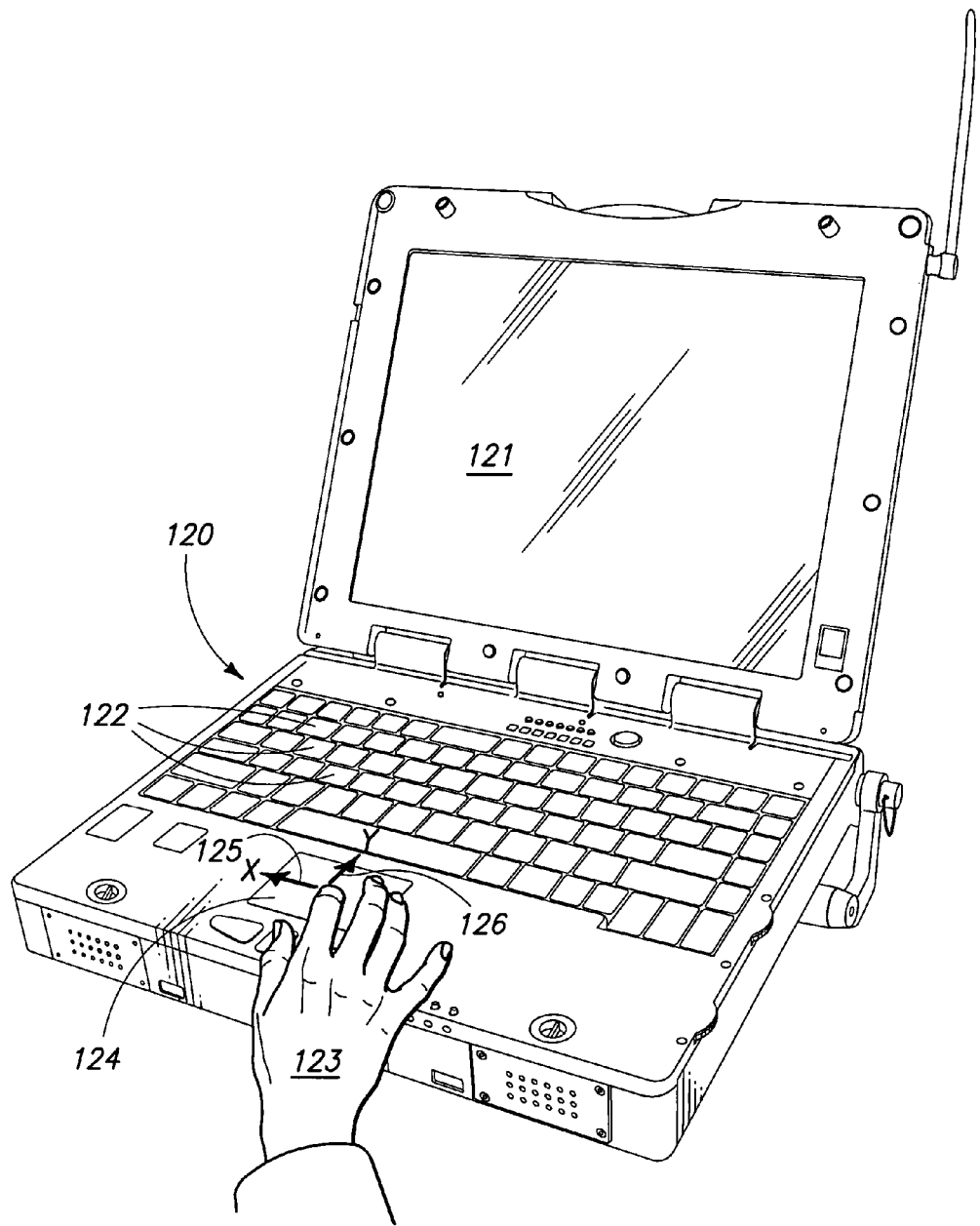
FIG. 3 is a perspective view of a user using a touch pad on a traditional laptop computer which also includes a keyboard, the touch pad being an X-Y device which may also measure pressure applied thereto.

FIG. 3 is a perspective view of a user's hand 123 using a touch pad 124 on a traditional laptop computer 120 which also includes keyboards, the touch pad being an X-Y device which may or may not also measure pressure applied thereto. FIG. 3 illustrates computer screen 121, or monitor, X-direction 125 and Y-direction 126 movement, and computer keys 122. It will be appreciated by those of ordinary skill in the art that the touch pad 124 is an X-Y device with X-Y device dynamics, but that it may also sense and provide data on pressure applied to the touch pad 124. The embodiments which may utilize pressure data may provide a substantial additional amount of measurable data from which distinctions can be made of users.

Figure 4:
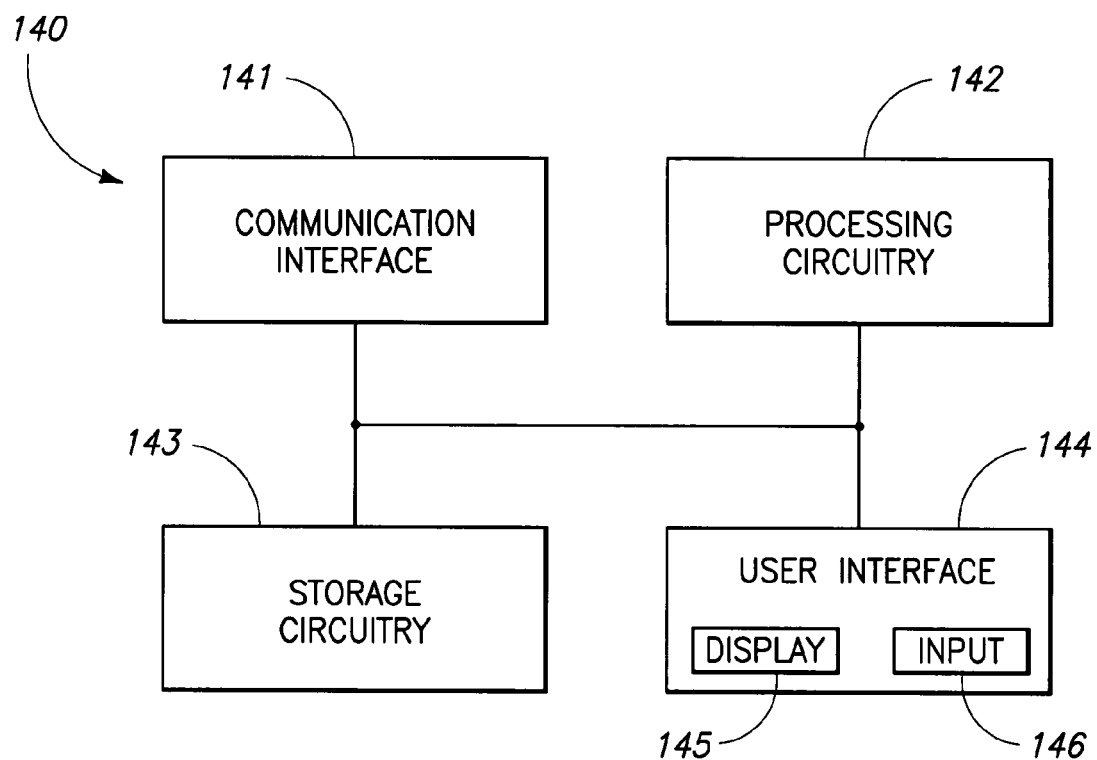
FIG. 4 is a block diagram of an exemplary data processing apparatus.

FIG. 4 is a block diagram of an exemplary data processing apparatus 140. FIG. 4 illustrates that communications interface 142 is arranged to implement communications of computing device 140 with respect to external devices not shown. For example, communications interface 142 may be arranged to communicate information bi-directionally with respect to computing device 140. Communications interface 142 may be implemented as a network interface card (NIC), serial or parallel connection, USB port, FireWire interface, flash memory interface, floppy disc drive, or any other suitable arrangement for communicating with respect to computing device 140.

In one embodiment, processing circuitry is arranged to process data, control data access and storage, issue commands, and control other desired operations. Processing circuitry 142 may comprise circuitry configured to implement desired programming provided by appropriate media in at least one embodiment. For example, the processing circuitry 142 may be implemented as one or more of a processor and/or other structure configured to execute executable instructions including, for example, software and/or firmware instructions, and/or hardware circuitry. Exemplary embodiments of processing circuitry include gloom hardware logic, PGA, FPGA, ASIC, state machines, and/or other structures alone or in combination with a processor. The storage circuitry 143 is configured to store programming such as executable code or instructions (e.g., software and/or firmware), electronic data, databases, or other digital information and may include processor-usable media. Processor-usable media may be embodied in any computer program, product(s), or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi conductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 143 described above and/or communicated via a network or other transmission media and configured to control appropriate processing circuitry 142. For example, programming may be provided via appropriate media including, for example, embodied within articles of manufacture, embodied within a data signal (e.g. modulated carrier wave, data packets, digital representations, etc.) communicated via an appropriate transmission medium, such as a communication network (e.g. the Internet and/or a private network), a wired in electrical connection, optical connection and/or electromagnetic energy, for example, via a communications interface 141, or provided using other appropriate communication structure or medium. Exemplary programming including processor-usable code may be communicated as a data signal embodied in a carrier wave in but one example.

Figure 5:
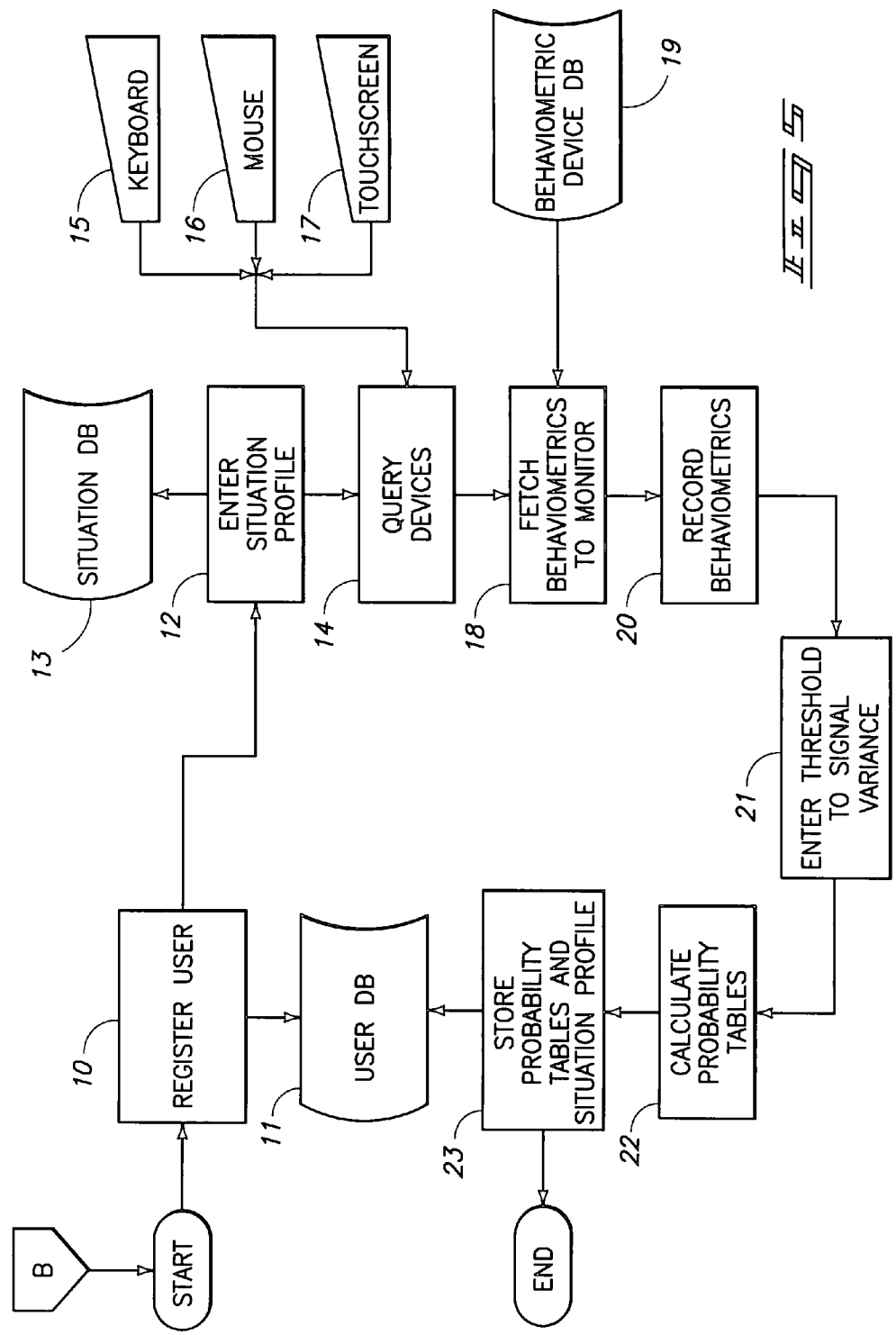
FIG. 5 is an exemplary flowchart illustrating one embodiment of this invention wherein a sequence of logical steps are shown which may access user interaction dynamics of a user in a specified situation.

User interface 144 is configured to interact with a user including conveying data to a user (e.g., displaying data for observation by the user, audibly communicating data to a user, etc.) as well as receiving input from the user (e.g., tactile input, voice instruction, etc.). Accordingly, in one exemplary embodiment, the user interface may include a display 145 (e.g., cathode ray tube, LCD, etc.) configured to detect visual information as well as a keyboard, mouse, touch pad, and/or other input device 146. Any other suitable apparatus for interacting with a user may also be utilized, including three-dimensional interfaces which instead of merely being on an X-Y plane may include three dimensions, namely X, Y and Z;

FIG. 5 is a exemplary flowchart illustrating one embodiment of this invention wherein a sequence of logical steps are shown which may access keyboard dynamics of a user.

FIG. 5 illustrates the process flow of the method and system for capturing and storing user behaviormetrics for the purpose of authenticating a user and performing situation analysis. The user is identified and registered 10 in a controlled situation or surreptitiously at a particular keyboard on the network of electronic devices. The user information is stored in the user database 11. The controlled situation is entered 12 and stored in the situation database 13. The system queries 14 the user interaction devices to determine their type 15-17. The system fetches 18 the behaviormetrics 19 associated with each device to monitor those behaviormetrics. As the user is interacting with the devices, the system records the behaviormetrics 20 associated with the device. Once the behaviormetrics are sufficiently recorded a threshold 21 for the user to signify a variance is entered which may or may not be equal to the threshold entered for the device. The system calculates 22 the probability tables and stores 23 the behaviormetrics profile for each device and controlled situation into the user database 11.

FIG. 6 is an exemplary flowchart illustrating an embodiment of this invention wherein the sequence of steps employed to configure a system to notify the proper sentries of a probability as to whether the purported authorized user is the authorized user based on keyboard dynamics or if a change in situation has occurred.

FIG. 6 illustrates the process flow for configuring the sentries, the means for contacting the sentries and the corrective actions regarding a discrepancy in user identification or change in situation. The sentry is entered into the system 24, and then the means to contact the sentry are entered 25. The means to contact the sentry 26 can be email, text messaging, telephone, paging or any communication protocol. The system queries the registered user 27 from the user database to be identified on the network or device 28. The users are grouped 29, and the sentry is assigned to the group to be the users under the sentry's auspices 30. The system queries the situations 31 to be monitored in the situation database 32. The situations are assigned to the sentry to monitor deviations from those situations 33. Once the sentry is configured, the system stores the sentry information 34 into the sentry database 35. Any alert messages 36 and any corrective actions for the sentry or sentries to execute are entered into the system 37. For example, actions to execute could be physically observing the user or turning on a camera to observe the user. Any executable corrective actions for the system to execute are entered as ancillary actions for the sentry 38. System actions, for example, could include logging the user out of the system and preventing re-entry. The system stores all alert messages, sentry corrective actions and executable corrective actions associated with a sentry or sentries 39 into the sentry database 35.

FIG. 7 illustrates the process flow for identifying the users and monitoring any change in situation at the device via the behaviormetrics of the device. The user enters the system 40 using various means that the system provides, which can be username/password or a public webpage. The system queries 42 the user interaction devices 43-45 to obtain the possible behaviormetrics at the point-of-entry of the user. If the device is unknown 46, the system then defines 47 the behaviormetrics for the device as provided by the system definition of FIG. 1. If the device is known, the system fetches the behaviormetrics to be monitored for the device 48 from the behaviormetric database 49. The system queries 50 the user signature database 41 to determine is the user is a known user. If the user is not found in the user database 51 the system assumes it is a new user and records 52 the behaviormetrics for the new user as provided by the system definition in FIG. 2. The system queries 53 the sentry database 54 for the actions associated with an unknown user. The system sends 55 messages 56 to the sentries associated with unknown users, executes 57 any actions associated with unknown users, and stores 58 the event of an unknown user into the sentry database 54.

Once the user is established, the system continuously monitors 59 the behaviormetrics using the stored profiles of the behaviormetrics of the purported user against the active behaviormetrics. The active user's behaviormetric profile is compared to the stored behaviormetric profile of the archived user 60 and to the behaviormetrics profile for stored situations 61. If the behaviormetric profile is within the threshold 62 stored behaviormetric profile for user identification, the system continues to monitor the behaviormetrics of the user. If the behaviormetric profile falls out of the threshold for identification, the system queries 63 the sentries associated with a breach in security event. The system sends 55 messages 56 to the sentries associated with a breach in security, executes 57 any actions associated with a breach in security, and stores 58 the event into the sentry database 54.

If the behaviormetrics are within the threshold for a situation 64, the system continues to monitor the behaviormetrics of the user. If the behaviormetrics falls out threshold for a situation, the system queries 63 the sentries associated with a change in situation for the situation. The system sends 55 messages 56 to the sentries associated with a change in situation, executes 57 any actions associated with a change in situation, and stores 58 the event into the sentry database 54.

FIG. 8 is a graphic representation of one embodiment of a probability distribution representation 400 for keystroke timings or dynamics of a user, User A, typing keystrokes ABC, sometimes referred to as a trigram since three keys are included. Even though there are three keys being identified as data or a characteristic for a given application, any other type of measurement or type of or combination of measurements may be taken to quantify that characteristic, and then utilized to distinguish and authorize the user possessing those characteristics from the remainder of the wide population or global population from which it is desired to distinguish the authorized user. Item 401 is the numeral one and indicates that the probability goes from zero represented by item 406, to the number one represented by item 401, as will be appreciated by those of ordinary skill in the art, on a statistical modeling basis. The probability 403 is graphed in the Y direction and the time 404 in this aspect or embodiment of the invention is measured in milliseconds. The graphic representation shows the time 404 going from zero, which is represented by item 406, to 5000 milliseconds represented by item 407.

FIG. 8 also illustrates how a couple of units of data may be compared against the user profile or probability distribution representation 400. For instance if data 411 is obtained at the millisecond level represented by 414, it may be expected that User A would show a value at the intersection represented by 409. However the data 411 is located some distance below intersection 409. The distance from data 412 to intersection 409 is represented by bracket 412 and the distance 413 between data 411 and intersection 414 is represented by bracket 413. In this example a visual check on the location of data 411 at the milliseconds represented by intersection 414, would indicate it is more probable than not that the data point represents User A. It will be appreciated by those of ordinary skill in the art that the pending upon the probabilities and the sensitivity and scaling of the probability distribution representation, a greater or lesser distance may or may not be indicative that it is more probable that the purported authorized user is in fact the authorized user, namely User A.

It will be appreciated by those of ordinary skill in the art that for illustrative purposes, graphical representations of the probability distribution representations are shown in the figures; however any type of representation thereof may be utilized within the contemplation of this invention, such as graphical representations, database or other data structure representations, or any nongraphical representations of the probability distribution, with no one in particular being required to practice this invention.

In a second example in FIG. 8, data 415 is shown with intersection 416 indicating the number of milliseconds, and intersection 417 indicating the intersection with the user profile or trigram for User A. Distance 418 from intersection 417 and distance 419 from intersection 416 would be utilized in any one of a number of different ways to calculate a probability that data 415 is indicative of use by the authorized user, namely User A.

It will also be appreciated by those of ordinary skill in the art that the representation shown in FIG. 8 need not be limited to keyboard dynamics, but may also include an X-Y dynamic related to the speed at which a user moves the X-Y device, such as mouse speed from point A to point B.

FIG. 8 represents one aspect of an embodiment of this invention wherein a trigram or three key keystroke is utilized to pattern or fingerprint User A, which can be one measurement taken of User A, or it could be an averaging or other statistical representation of two or more measurements blended together to arrive at curve 405 in FIG. 8, up to some very high number of measurements scaled to present one probability distribution representation. FIG. 8 shows a narrow band of occurrences in milliseconds relative to probability, making User A relatively distinctive from a wide population sampling or from the global probability distribution representation. In embodiments of this invention, the area 409 under curve 405 should also be one based upon probability distribution representation analysis. The curve 405 is a first constant that gives a continuous basis upon which to compare new data or data on curve 405, to a global trigram such as the global trigram set forth in FIG. 10 for the ABC keystroke combination.

Since many features are recorded for keystroke dynamics, the probability distribution representations can be used to determine more distinguishing features of a user. Those of ordinary skill in the art will appreciate that the same or similar features may be recorded for X-Y device dynamics. In turn, the distinguishing features can be used to construct a biased scoring system to authenticate the user. FIGS. 8-11 illustrate the graphs of the probability distribution representations constructed from the data in Tables 2 and 4. FIG. 8 is the graph for the User A probability distribution representation for the trigram ABC and FIG. 9 is the graph for the User A probability distribution representation for the trigram BCD. FIG. 10 is the graph for the global probability distribution representation for the trigram ABC and FIG. 11 is the graph for the global probability distribution representation for the trigram BCD.

Figure 12:
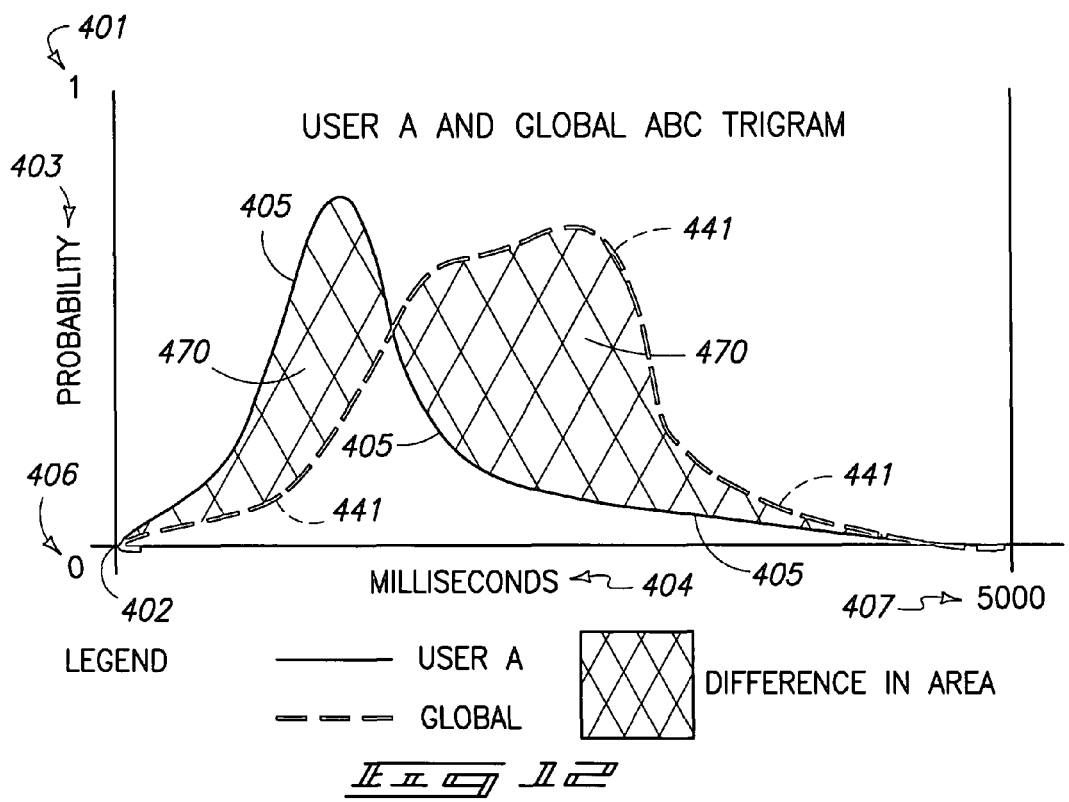
FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10.
Figure 13:
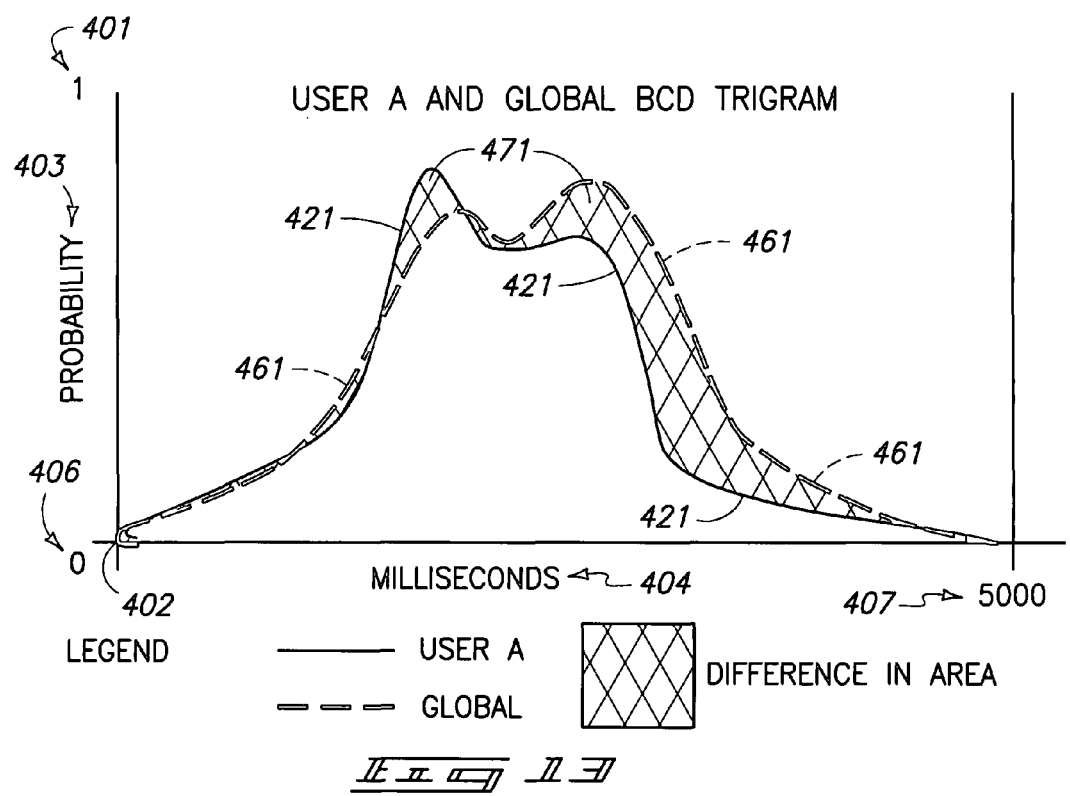
FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11.

Overlaying the graphs between the user and the global user base for each trigram, FIGS. 12 and 13, and calculating the difference in area 470 and 471 respectively, between the curves, which is the hashed area between the graphs, the ABC trigram user probability distribution representation shows a larger deviation from the global or wide population probability distribution representation. Therefore, the ABC trigram is a more distinguishing feature for the user. Total difference in area under the User A and the global probability curves for the ABC trigram is 1.1, while the total difference in area for the BCD trigram is 0.20. Normalizing these values produces a weighting vector for calculating the final posterior probability. The weighting vector is 0.85 and 0.15 for the ABC and BCD trigrams respectively, yielding a final posterior probability given by equation 1.

$$\text{Posterior}_{final} = (0.85 * \text{Posterior}_{ABC}) + (0.15 * \text{Posterior}_{BCD}) \quad (1)$$

The total posterior calculated for determining the likelihood that a user is User A is now biased towards the posterior probability returned from the ABC trigram measurement. An impostor or purported authorized user will more likely fall in the global likelihood and the calculated total posterior will reflect a strengthened likelihood the impostor will be detected as such. The weights attributed to the features of the trigram measurements can also be used in constructions of neural networks, support vector machines and boosting algorithms to further strengthen the bias of the more distinguishable features of an individual.

It will be noted that while the distribution representations in FIG. 8 through 13 are using keystroke data such as ABC or BCD, that these are representative of only one type of data, whereas the invention and the comparings of the representative distributions may be for any other data which is desired to be compared, as disclosed elsewhere herein, with no one particular type of data being required to practice this invention. So instead of the representative distribution being for the BCD keystroke combination, it could be for whatever the ABC data is, only wherein the user is under high stress or fatigue.

FIG. 9 is a graphic representation of one embodiment of a probability distribution representation for keystroke timings of a user typing keystrokes BCD. The graphical item numbers, item descriptions and the descriptions of the graph format, the X and Y parameters and measurements, is recited above with respect to FIG. 8, and all like items are numbered accordingly and a description thereof will not repeated here to avoid repetition. FIG. 9 is a graphic representation of User A typing a keystroke combination of BCD, a trigram, which provides a table of a similar graphic representation, but a very different curve than that shown for User A for the ABC trigram in FIG. 8. The curve illustrated in FIG. 9 is very different than the curve illustrated in FIG. 8 for the same user, namely User A. the area 423 under curve 421 in probability distribution representation for 20 should be one. Curve 421 peaks at 421*a*. In another use of this comparing in other embodiments of this invention, the User BCD trigram may actually instead represent the same keystrokes as for the User ABC trigram, only the BCD represents the characteristics or data for User A in a situation (such as a highly stressed condition for example).

FIG. 10 is a graphic representation of one embodiment of a probability distribution representation for keystroke timings of a wide population demographic user group typing keystrokes ABC. The graphical item numbers, item descriptions and the descriptions of the graph format, the X and Y parameters and measurements, is recited above with respect to FIG. 8, and all like items are numbered accordingly and a description thereof will not repeated here to avoid repetition.

FIG. 10 illustrates a wide population first characteristic probability distribution representation, in this example, a global ABC trigram probability distribution representation, which also may be referred to as a histogram or a bar chart. FIG. 10 shows curve 441 with curve peak 441*a*, area 443 under curve 441 on probability distribution representation 440 illustrates the probabilities of timing of the wide population.

It will be appreciated by those of ordinary skill in the art that the selection of the first characteristic upon which to take data for, or the second third or later characteristics, will be something that greatly depends upon the facts and circumstances of the application, readily available data, readily available measurements and numerous other factors, all within the contemplation of this invention. The wide population characteristic probability distribution representation construction provides a very scalable method of taking data in quantity's that can be determined from the circumstances, including huge numbers of data points, to construct a probability distribution representation or histogram against which to compare characteristics or data of individuals. In some applications the wide population data or characteristic can comprise the probability distribution representation profile table or graph, and in others it may represent data from multiple, numerous or a multitude of persons (such as within a demographic or within a broader universe).

FIG. 11 is a graphic representation of one embodiment of a probability distribution representation for keystroke timings of a wide population demographic user group typing the keystrokes BCD. The graphical item numbers, item descriptions and the descriptions of the graph format, the X and Y parameters and measurements, is recited above with respect to FIG. 8, and all like items are numbered accordingly and a description thereof will not repeated here to avoid repetition.

FIG. 11 represents a probability distribution representation 460 for the wide population data for the keystroke BCD combination or trigram, with area 463 under curve 461. Similar to the global or wide population probability distribution representation in FIG. 10, the probability distribution representation 460 in FIG. 11 may be that of numerous data points from one individual, or from a wide population of numerous individuals, depending upon the application and the distinction desired.

FIG. 12 is a graphic representation of one embodiment of a probability distribution representation for a user typing the keystrokes ABC illustrated in FIG. 8, overlaid on the embodiment of the probability distribution representation for keystroke timings of a wide population demographic user group typing keystrokes ABC illustrated in FIG. 10. The graphical item numbers, item descriptions and the descriptions of the graph format, the X and Y parameters and measurements, is recited above with respect to FIG. 8, and all like items are numbered accordingly and a description thereof will not repeated here to avoid repetition. Again, neither a graphical representation nor an overlay is required to practice this invention, but is shown in FIGS. 12 and 13 for illustrative purposes.

FIG. 12 illustrates some of the numerous possibilities for use of the probability distribution representations or histograms as may be utilized by the embodiment of this invention. The probability distribution representation illustrated in FIG. 12 is an overlay of the probability distribution representation in FIG. 8 of User A typing ABC trigram, onto the global ABC trigram illustrated in FIG. 10, showing dramatic distinctions or uniqueness between User A the rest of the population, indicating this may be a more accurate characteristic or data point upon which to distinguish User A from the general population and authenticate the keystrokes of User A curve 405 is the User A curve profile on probability distribution representation, and curve 441 is the global or wide population curve for the keystrokes ABC. The area 470 between curve 405 and curve 441 provides a larger area upon which to distinguish or compare a given data point placed therein to the User A curve versus the wide population curve 441.

FIG. 13 is a graphic representation of one embodiment of a probability distribution representation for a user typing the keystrokes BCD illustrated in FIG. 9, overlaid on the embodiment of the probability distribution representation for keystroke timings of a wide population demographic user group typing keystrokes BCD illustrated in FIG. 11. The graphical item numbers, item descriptions and the descriptions of the graph format, the X and Y parameters and measurements, is recited above with respect to FIG. 8, and all like items are numbered accordingly and a description thereof will not repeated here to avoid repetition.

In a similar manner to FIG. 12, FIG. 13 is an overlay of the User A BCD trigram, which is User A typing a sequence of keys on a keyboard, namely keys B, C, and D, as represented by curve 421. Curve 461 is the wide population curve illustrated in FIG. 11 of the same keystrokes, namely keystrokes BCD. From comparing curve 421 to curve 461 in FIG. 13, it is apparent that User A is very similar to the wide population curve 461 and in comparing the results of the overlay shown in FIG. 13 to that in FIG. 12, it becomes very apparent that in choosing the best characteristic of this set to use to distinguish User A from the general population is keystroke combination ABC and not the keystroke combination BCD. It will be appreciated that the wide population distribution representation may also be one of users in a given situation, against which the data from the authorized user may be compared to determine if that authorized user at that time is in the situation, in a similar fashion to the other comparings described herein.

FIG. 14 is an example of flowchart of an embodiment of this invention illustrating one possible sequence for constructing a biased scoring system using a characteristic data of an authorized user. FIG. 14 illustrates the process flow to construct weights for the features captured by keystroke dynamics. The system includes start 500, a retrieval of user probability distribution representation 501 from the probability distribution representations 502 for data, characteristics or identifying features for a user or an authorized user. The system retrieves the 503 global probability distribution representations 502 for each feature recorded for the global user base. The probability curve of the user is compared to the global probability curve and a value is calculated 504 for each feature based on the difference the user probability curve deviates from the global probability curve. The values may be normalized 505 to construct a weighting vector for the set of features recorded for keystroke dynamics. The values from the normalization are stored 506 with the probability distribution representations for each feature recorded for the user.

FIG. 15 is an example of a flowchart of an embodiment of this invention illustrating one possible sequence for identifying an anonymous user provided the user behaviormetrics are stored within the system. The anonymous user enters the system 601. The system queries 602 the user interaction devices, such keyboard 603, mouse 604 or touchscreen 605 to identify the devices with which to monitor behaviormetrics. The behaviormetrics to monitor are retrieved 605 from the behaviormetric database 606 previously filled through the process illustrated in FIG. 8. The system continuously records the behaviormetric measurements of the anonymous user 607 until the user leaves the system 608. As the behaviormetrics are recorded, the system calculates 609 the user behaviormetrics profiles as described in Tables 1 and 2 for each behaviormetrics measurement assigned to the user interaction devices. To retrieve the most likely candidates as an identity to the anonymous user, the system matches 610 the recorded behaviormetrics of the anonymous user to the behaviormetrics of the stored users 611. One embodiment for calculating the proximity of an anonymous user to a known user is to calculate the overlay of each behaviormetric measurement between the anonymous user and each known user, as similarly illustrated in FIGS. 12 and 13 between User A and global user base. Summing the total contribution of each behaviormetric measurement yields a score as to the proximity of the anonymous user to each known user. The highest scores yield a list of user identities for the anonymous user 612.

As will be appreciated by those of reasonable skill in the art, there are numerous embodiments to this invention, and variations of elements, steps and system components which may be used, all within the scope of this invention.

In one embodiment for instance, an authorized user authentication method may be provided which comprises: accessing data from an authorized user; using the data to create a first characteristic probability distribution representation indicative of the authorized user; accessing situation data from the authorized user during a situation; using the situation data to create a situation characteristic probability distribution representation indicative of the authorized user in a situation; accessing new data from a purported authorized user; comparing the new data of the purported authorized user to the first characteristic probability distribution representation for the authorized user; determining a probability that the purported authorized user is the authorized user based on the comparing; comparing the new data of the purported authorized user to the situation characteristic probability distribution representation for the authorized user; and determining a probability that the purported authorized user is in the situation based on the comparing.

In a further embodiment of the preceding, the authorized user authentication method may further comprise: providing a wide population first characteristic probability distribution representation indicative of the situation characteristic of a wide population; comparing the new data of the purported authorized user to at least one of the situation characteristic probability distribution representation for the authorized user and the wide population situation characteristic probability distribution representation; and determining a probability that the purported authorized user is the authorized user and is in the situation, based on the comparing; and/or further wherein determining the probability that the purported authorized user is the authorized user through the application of Bayes Rule to the new data, the first characteristic probability distribution representation for the authorized user, and the wide population first characteristic probability distribution representation.

It will be noted that the data referred to in these embodiments may but need to not be one of a keyboard dynamic and an X-Y device dynamic, or further wherein the X-Y device dynamic is one of a mouse use dynamic and a touchpad use dynamic.

In another embodiment of the invention, a method for matching a characteristic of an anonymous user to a characteristic of one of a plurality of users may be provided, which comprises: accessing data from each of a plurality of users; using the data to create a plurality of first characteristic probability distribution representations indicative of each of the plurality of users; accessing new data from an anonymous user; comparing the new data to the plurality of first characteristic probability distribution representations indicative of each of the plurality of users; and determining a probability that the anonymous user is one of the plurality of users based on the comparings.

In yet another embodiment of the invention, a method for matching a characteristic of an anonymous user to a characteristic of one of a plurality of users may be proviced, comprising: accessing situation data from each of the plurality of users in a situation; using the situation data to create a plurality of situation characteristic probability distribution representations indicative of each of the plurality of users in the situation; accessing new situation data from an anonymous user; comparing the new situation data to the plurality of situation characteristic probability distribution representations indicative of each of the plurality of users; and determining a probability that the anonymous user is in the situation based on the comparing.

A further method from that disclosed in the preceding paragraph may be providing the method for matching a characteristic of an anonymous user to a characteristic of one of a plurality of users, and further wherein the situation data used to create a plurality of first characteristic probability distribution representations indicative of each of the plurality of users is comprised of one of a keyboard dynamic and an X-Y device dynamic in the situation.

It should be noted that the situations referred to above may be any one of a number of different types and natures of situations or conditions, such as a high stress situation or a high fatigue situation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A computerized method for authenticating a user of an electronic system, comprising:
   accessing, from a storage circuitry, data relating to measured parameters for a plurality of interactions with an input device for a purported authorized user;
   accessing, from the storage circuitry, a first situation probability distribution representation for the plurality of interactions for an authorized user, while in a known situation;
   accessing, from the storage circuitry, a first situation probability distribution representation for the plurality of interactions for a wide population, while in a known situation;
   determining with a computer processing circuitry, a value indicative of whether the purported authorized user is the authorized user, utilizing (a) the data for the purported authorized user for the plurality of interactions, (b) the first situation probability distribution representation for the authorized user for the plurality of interactions, and (c) the first situation probability distribution representation for the wide population for the plurality of interactions; and
   authenticating with the computer processing circuitry, the purported authorized user as the authorized user, if the value satisfies a prescribed threshold.

2. The computerized method for authenticating a user as recited in claim 1, further comprising accessing a belief value indicative of a prior probability whether the purported user is the authorized user; wherein, in the determining step, the utilizing further includes the belief value.

3. The computerized method for authenticating a user as recited in claim 1, wherein the input device is selected from a group consisting of keyboard, a keypad, a touch screen, touch pad, a mouse, or other X-Y device.

4. The computerized method for authenticating a user as recited in claim 1, wherein the interaction is selected from a list consisting of a keystroke dynamic, a type of body movement, a facial profile, and an X-Y device dynamic.

5. The computerized method for authenticating a user as recited in claim 1, wherein the authentication step further includes executing predefined security actions if the value fails to satisfy a security threshold level.

6. The computerized method for authenticating a user as recited in claim 1, wherein the first situation probability distribution representation for the wide population excludes the authorized user.

7. A computerized method for authenticating a user of an electronic system, comprising:
   accessing, from a storage circuitry, data for measured interactions with one or more input devices for a purported authorized user, including a first interaction and a second interaction;
   accessing, from the storage circuitry, user probability distribution representations for an authorized user relating to measured interactions with one or more input devices, including the first interaction and the second interaction, while in a known situation;
   accessing, from the storage circuitry, global probability distribution representations for a wide population based on the wide population performing interactions with one or more input devices, including the first interaction and the second interaction, while in a known situation;
   determining with a computer processing circuitry, a total value indicative of whether the purported authorized user is the authorized user, utilizing (a) the data for the purported authorized user for the first interaction and the second interaction, (b) the user probability distribution representations for the first interaction and the second interaction, and (c) the global probability distribution representations for the first interaction and the second interaction; and
   authenticating with a computer processing circuitry, the purported authorized user to be the authorized user for authentication, if the total value satisfies a prescribed threshold.

8. The computerized method for authenticating a user as recited in claim 7, wherein the one or more input devices is selected from a group consisting of keyboard, a keypad, a touch screen, a touch pad, a mouse, or other X-Y device.

9. The computerized method for authenticating a user as recited in claim 7, wherein the measured interactions are selected from a list consisting of keystroke dynamics, types of body movements, facial profiles, and X-Y device dynamics.

10. The computerized method for authenticating a user as recited in claim 7, wherein the authentication step further includes executing predefined security actions if the value fails to satisfy a security threshold level.

11. The computerized method for authenticating a user as recited in claim 7, wherein the global probability distribution representations exclude the authorized user.

12. The computerized method for authenticating a user as recited in claim 7, wherein the first interaction and the second interaction performed with different types of input devices.

13. The computerized method for authenticating a user as recited in claim 7, wherein at least one of the user probability distribution representation and the global probability distribution representation further accounts for parameters for time of day and type of application.

14. The computerized method for authenticating a user as recited in claim 7, further comprising accessing a belief value indicative of a prior probability whether the purported user is the authorized user; wherein, in the determining step, the utilizing further includes the belief value.

15. A computerized system for authenticating a user of an electronic system, comprising:
   a storage circuitry that stores
      purported-user data for measured interactions with one or more input devices for a purported authorized user,
      a first situation probability distribution representation for the plurality of interactions for an authorized user, while in a known situation; and
   a first situation probability distribution representation for the plurality of interactions for a wide population, while in a known situation;
   a processing circuitry configured to determine a value indicative of whether the purported authorized user is the authorized user, utilizing (a) the data for the purported authorized user for the plurality of interactions, (b) the first situation probability distribution representation for the authorized user for the plurality of interactions, and (c) the first situation probability distribution representation for the wide population for the plurality of interactions; and to control access of the purported authorized user based on the value.

16. The system as recited in claim 15, wherein purported-user data is configured as probability distribution representations, while in a known situation.

17. The system as recited in claim 15, first situation probability distribution representation for the plurality of interactions for a wide population, while in a known situation, excludes the authorized user.

18. The system as recited in claim 15, wherein the digital storage assembly further stores a belief value indicative of a prior probability whether the purported authorized user is the authorized user; wherein further the determining further utilizes the belief value.

19. The system as recited in claim 15, further configured to execute computer-readable instructions for monitoring interactions with the one or more input devices by the purported authorized user to update the data characteristic of a purported authorized user in the digital storage assembly.

20. The system as recited in claim 15, wherein the interactions are selected from a list consisting of keystroke dynamics, types of body movements, facial profiles, and X-Y device dynamics.

* * * * *